W. P. RICKARD.
HOISTING CHAIN.
APPLICATION FILED OCT. 20, 1921.
1,427,642.
Patented Aug. 29, 1922.
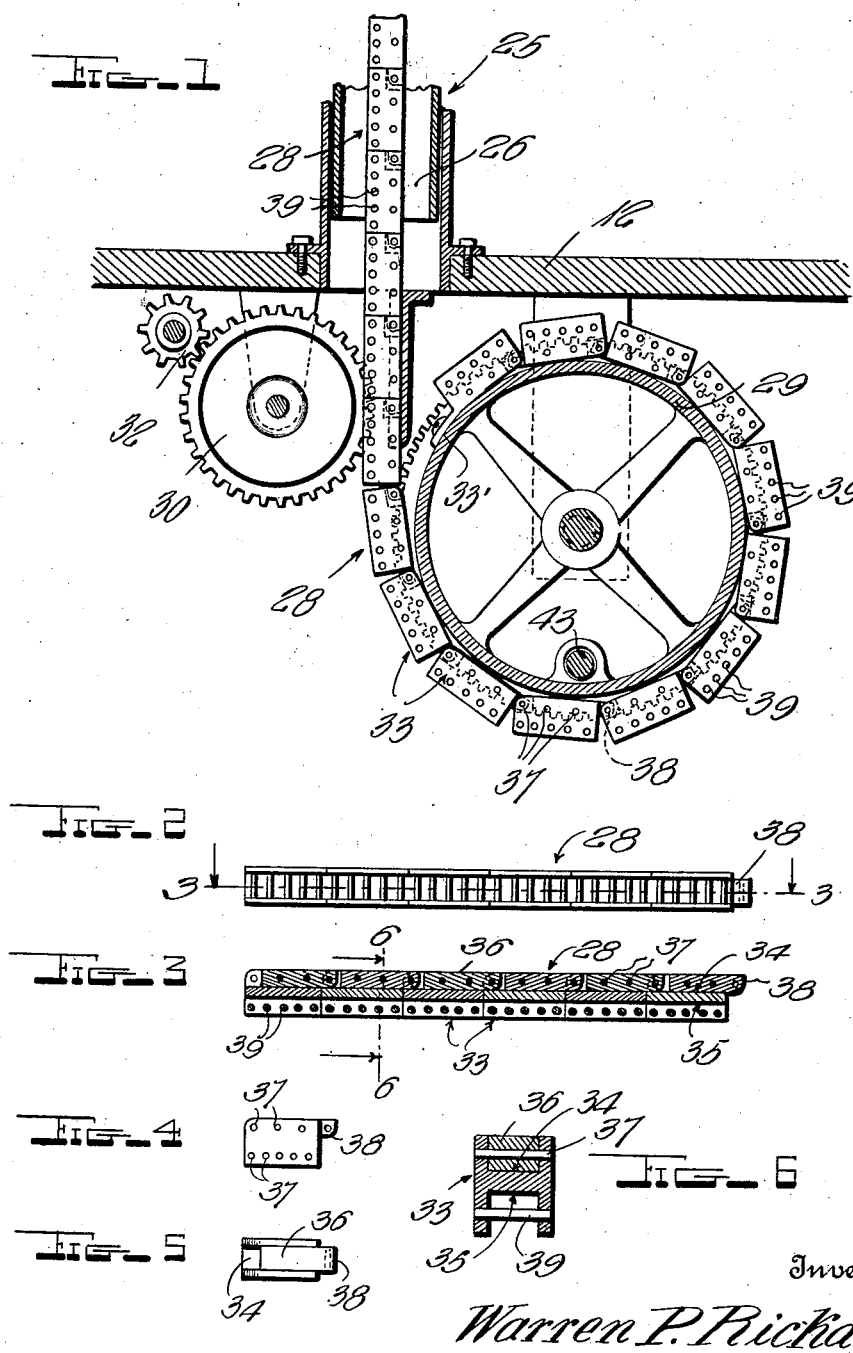
Inventor
Warren P. Richard
By *H. B. Williston &co.*
Attorneys

UNITED STATES PATENT OFFICE.

WARREN P. RICKARD, OF PLYMOUTH, MASSACHUSETTS.

HOISTING CHAIN.

1,427,642. Specification of Letters Patent. Patented Aug. 29, 1922.

Application filed October 20, 1921. Serial No. 509,153.

*To all whom it may concern:*

Be it known that I, WARREN P. RICKARD, a citizen of the United States, residing at Plymouth, in the county of Plymouth and State of Massachusetts, have invented certain new and useful Improvements in Hoisting Chains; and I do declare the following to be a full, clear, and exact description of the invention, such as will enable others skilled in the art to which it appertains to make and use the same.

This invention relates to an improved hoisting chain which is especially, but not necessarily, designed for use on fire-fighting apparatus.

The principal object of the invention is to provide a novel chain to take the place of the one used in Patent 1,555,958, granted to me on October 5, 1915. In this patent, the chain is referred to as a flexible rack bar and by carefully examining the same it will be seen that it is composed of a plurality of comparatively short rack bars pivotally connected with one another so as to permit them to be wound around the periphery of the rotary and transversely movable drum supported on the wheeled support.

Practical experience with the patented type of hoisting chain or flexible rack bar has continuously brought out the fact that it is not desirable in all instances in view of the fact that the rack members themselves are too long and the chain does not conform properly to the periphery of the drum, the rack bars are not desirable from the manufacturer's viewpoint and the pivot connection is not sufficiently strong to resist the strain placed thereon and frequent breakage results.

In view of the foregoing circumstances, I have devised a flexible hoisting chain to take the place of the one above discussed, the improved chain being composed of comparatively short links which have recesses formed at one of their ends into which the comparatively long apertured extensions of the adjacent links extend and are confined to effectively connect the links together and prevent relative side movements thereof.

Another object of the invention is to provide an improved hoisting chain which will conform effectively to the periphery of the drum, the same being composed of links having teeth in the form of transversely disposed spaced pins which are capable of being quickly replaced in case of breakage.

Other objects and advantages of the invention will be apparent during the course of the following description.

In the accompanying drawings forming a part of this specification and in which like numerals are employed to designate like parts throughout the same:

Figure 1 is an enlarged detail sectional view of a portion of a wheel-supported platform showing the drum mounted thereon and parts with which it co-acts together with my improved hoisting chain wound on said drum.

Figure 2 is a top plan view of the chain.

Figure 3 is a longitudinal section taken substantially on the plane of the line 3—3 of Fig. 2.

Figure 4 is a side elevational view of one of the links.

Figure 5 is a top plan view thereof.

Figure 6 is an enlarged cross section taken through one of the links substantially on the plane of the line 6—6 of Fig. 3.

Referring to the drawings, it will be seen that the numeral 12 designates a wheel supported platform on which a vertically extensible standard 25 is mounted, the same being composed of the telescopically engaged sections 26. It is to be stated here that although it is not shown in this drawing, it is understood that these sections are successively raised by the means shown and described in the above referred to patent and that the ladder sections are connected therewith in the same way as set forth in said patent. The improved flexible rack bar or hoisting means which is generally indicated by the numeral 28 is shown partially wound on the rotary drum 29 which is supported from the platform in any desired way and is movable transversely across the same by the screw shaft 43 so as to insure proper winding and unwinding of the chain. Also supported on the underface of the platform in a position for co-operation with the links of the chain is a relatively large gear 30 driven by a pinion 32.

As previously indicated, the invention resides in the construction of the flexible hoisting chain 28 which is a decided improvement on the corresponding element of my patented device as will be seen from glancing at the drawings and comparing the improved chain with the one disclosed in my patent. The improved chain is composed of a plurality of comparatively short links 33 which are pivotally connected together and are wound on the periphery of the drum 29 so as to permit them to effectively conform to the latter, the endmost link being rigidly connected to the drum as indicated at 33'. Although the links 33 can be constructed otherwise, it will be seen by carefully examining the enlarged cross sectional view in Fig. 6 that each one is substantially H-shaped in cross section to form upper and lower channels 34 and 35 respectively. A substantially rectangular block 36 is fitted into the upper channel 34 and is held in position by rivets or other suitable fastenings 37. It is to be noted that this block extends beyond one end of the link as indicated at 38 while its opposite end terminates short of the other end of the link to provide a space for reception of the extended end of the block of the adjoining or adjacent link. The extended end 38 of the block is formed with an aperture and the sides of the channel 34 between which this extension is received are formed with openings which register with the opening in said extension and a pivot pin is passed through these openings to pivotally connect the links together and permit free relative movement thereof. By disposing the extended end of the block 36 between the side walls of the upper channel, it is obvious that relative side movements of the links is overcome as much as possible. Consequently, effective operation of the improved chain is thus insured as relative side movements of the rack members of my patented chain is disadvantageous. A plurality of pins 39 are arranged transversely across the channel 35 and connected with the side walls of the latter and are spaced from the bottom thereof and constitute teeth for engagement with the corresponding elements of the gear 30. In my patented links, the teeth are integral and are not easily repaired. However, by forming the teeth from pins as above indicated, it is possible to quickly and easily remove and replace one of the pins, in case it becomes broken.

Inasmuch as the operation of the fire fighting apparatus has been clearly set forth in detail in the above named patent and as the features of this invention reside only in the construction of the flexible hoisting means which is especially designed for use in connection with such apparatus, it is thought unnecessary to enter a description of the operation in this application. Furthermore, as the specific construction of the links for forming the chain has been clearly set forth and as the advantages have been fully indicated, it is thought unnecessary to enter into a more detailed description.

While I have shown and described my improved hoisting means for use in connection with a particular kind of an apparatus, I, of course, wish it to be understood that it is not to be restricted to this use because it is capable of being used on various other types of machines.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

A flexible hoisting chain composed of a plurality of relatively short links which are H-shaped in cross section to provide channels, a plurality of transversely disposed pins arranged in one of said channels and connected to the side walls thereof to form teeth for co-operation with the teeth of a gear or the like, and blocks arranged in the remaining channel, one end of each of the blocks extending beyond one end of the respective link and being apertured, the remaining end of said block terminating short of the opposite end of the link and forming a space in which the extended end of the block of the adjoining link is received.

In testimony whereof I have hereunto set my hand.

WARREN P. RICKARD.